US009559944B2

(12) United States Patent
Beller et al.

(10) Patent No.: US 9,559,944 B2
(45) Date of Patent: Jan. 31, 2017

(54) METHOD AND RELATED APPARATUS FOR ESTABLISHING LINK-DIVERSE TRAFFIC PATHS IN A TELECOMMUNICATIONS NETWORK

(71) Applicant: Alcatel Lucent, Boulogne Billancourt (FR)

(72) Inventors: Dieter Beller, Korntal (DE); Donald Fedyk, Groton, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 100 days.

(21) Appl. No.: 14/406,829

(22) PCT Filed: Jun. 17, 2013

(86) PCT No.: PCT/EP2013/062501
§ 371 (c)(1),
(2) Date: Dec. 10, 2014

(87) PCT Pub. No.: WO2014/009105
PCT Pub. Date: Jan. 16, 2014

(65) Prior Publication Data
US 2015/0172171 A1 Jun. 18, 2015

(30) Foreign Application Priority Data

Jul. 9, 2012 (EP) ..................... 12305817

(51) Int. Cl.
*H04L 12/28* (2006.01)
*H04L 12/707* (2013.01)
(Continued)

(52) U.S. Cl.
CPC ............ *H04L 45/24* (2013.01); *H04L 45/128* (2013.01); *H04L 45/50* (2013.01); *H04L 47/125* (2013.01);
(Continued)

(58) Field of Classification Search
None
See application file for complete search history.

(56) References Cited

U.S. PATENT DOCUMENTS

| | | | |
|---|---|---|---|
| 8,861,340 B1* | 10/2014 | Atlas | H04L 45/28 370/225 |
| 2003/0084367 A1* | 5/2003 | Suemura | H04J 14/0227 714/4.11 |

(Continued)

FOREIGN PATENT DOCUMENTS

| | | |
|---|---|---|
| CN | 101399771 | 4/2009 |
| EP | 1443716 | 5/2007 |

(Continued)

OTHER PUBLICATIONS

ITU-T Standard; Architecture and Specification of Data Communication Network; G.7712/Y.1703 (Sep. 2010); ITU-T Standard, International Telecommunication Union, Geneva; CH; No. G.7712/Y.1703 (Sep. 2010); Sep. 6, 2010; pp. 1-96; XP017467837.

(Continued)

*Primary Examiner* — Michael J Moore, Jr.
(74) *Attorney, Agent, or Firm* — Patti & Malvone Law Group, LLC

(57) ABSTRACT

In order to achieve path diversity for dual-homed User-Network Interface clients connected to a Generalized Multiprotocol Label Switching control plane enabled transport network that is operated in an overlay mode, the overlay extension service model is enhanced by adding shared constraint information for path diversity in the optical transport network. In particular, within the provider network, shared constraint information of a first traffic path is determined and a data element indicative of the shared constraint information is returned by a first provider edge node to a customer edge device via a User-Network Interface. When the customer edge device requests a second traffic path (Continued)

through the provider network to be established from a second provider edge node and to be disjoint from said first traffic path, the customer edge device forwards the data element to the second provider edge node to enable path calculation of the second traffic path using the shared constraint information as exclusion list.

9 Claims, 3 Drawing Sheets

(51) Int. Cl.
H04L 12/735 (2013.01)
H04L 12/723 (2013.01)
H04L 12/803 (2013.01)
H04Q 11/00 (2006.01)

(52) U.S. Cl.
CPC ... H04Q 11/0066 (2013.01); *H04Q 2011/0073* (2013.01); *H04Q 2011/0077* (2013.01); *H04Q 2011/0081* (2013.01); *H04Q 2011/0086* (2013.01)

(56) References Cited

U.S. PATENT DOCUMENTS

| | | | |
|---|---|---|---|
| 2003/0145246 A1* | 7/2003 | Suemura | H04L 12/437 714/2 |
| 2006/0114818 A1* | 6/2006 | Canali | H04L 45/00 370/216 |
| 2007/0091793 A1* | 4/2007 | Filsfils | H04L 12/4633 370/228 |
| 2008/0019266 A1* | 1/2008 | Liu | H04L 12/5695 370/228 |
| 2009/0103442 A1 | 4/2009 | Douville | |
| 2010/0315943 A1* | 12/2010 | Chao | H04L 41/0668 370/221 |
| 2012/0224583 A1* | 9/2012 | Sergeev | H04L 12/413 370/395.5 |
| 2013/0121164 A1* | 5/2013 | Shabtay | H04L 12/4641 370/241.1 |

FOREIGN PATENT DOCUMENTS

| | | |
|---|---|---|
| EP | 2267954 | 12/2010 |
| JP | 2004158971 | 6/2004 |
| JP | 2007274249 | 10/2007 |
| WO | 2010118964 | 10/2010 |
| WO | 2010149562 | 12/2010 |
| WO | 2012083790 | 6/2012 |

OTHER PUBLICATIONS

Fedyk, D. et al; Layer 1 VPN Enhanced Mode—Overlay Extension Service Model; draft-fedyk-ccamp-l1vpn-extnd-overlay-00.txt; Internet Engineering Task Force, IETF; Standardworkingdraft, Internet Society (ISOC) 4, Rue des Falaises CH-1205 Geneva, Switzerland; Jul. 9, 2012; pp. 1-19; XP015083856.

* cited by examiner

```
 0                   1                   2                   3
 0 1 2 3 4 5 6 7 8 9 0 1 2 3 4 5 6 7 8 9 0 1 2 3 4 5 6 7 8 9 0 1
|          Length           |    Type     |0|     C-Type      |

0                   1                   2                   3
 0 1 2 3 4 5 6 7 8 9 0 1 2 3 4 5 6 7 8 9 0 1 2 3 4 5 6 7 8 9 0 1
| ADDR Length | No. of PAS  |D|         reserved              |
|              Path Affinity Set identifier                   |
|                 Source Address (variable)                   |
|               Destination Address (variable)                |
```

METHOD AND RELATED APPARATUS FOR ESTABLISHING LINK-DIVERSE TRAFFIC PATHS IN A TELECOMMUNICATIONS NETWORK

FIELD OF THE INVENTION

The present invention relates to the field of telecommunications and more particularly to a method and related apparatus for establishing link-diverse traffic paths in a telecommunications network.

BACKGROUND OF THE INVENTION

In classical layer 1 transport networks employing time-division multiplexing (TDM) and/or wavelength division multiplexing (WDM), such as the Optical Transport Network (OTN) or the Synchronous Digital Hierarchy (SDH), techniques have been established to support dynamic resource allocation and setup of traffic paths. A transport network, which allows traffic paths to be set up through a switched network automatically is termed Automatically Switched Transport Network (ASTN) or Automatically Switched Optical Network (ASON). The WDM layer is often also called layer 0.

Traditionally, creating traffic paths through a series of Network Elements has involved configuration of individual cross-connections on each network element. ASTN/ASON allows the user to specify the start point, end point, and bandwidth required, and the ASTN/ASON agent on the network elements will allocate the path through the network, provision the traffic path, set up cross-connects, and allocate bandwidth from the paths for the user requested service. The actual path that the traffic will take through the network is not specified by the user.

A protocol suite known as GMPLS (Generalized Multi-protocol Label Switching) has been developed to dynamically provision resources and to provide network survivability using protection and restoration techniques. GMPLS includes three main protocols: a signaling protocol known as the Resource Reservation Protocol with Traffic Engineering extensions (RSVP-TE), a routing protocol known as the Open Shortest Path First with Traffic Engineering extensions (OSPF-TE), and the Link Management Protocol (LMP).

The underlying architecture of an ASTN/ASON assumes a forwarding (or data) plane and a separated control plane, where each of the network layers can use physically diverse data or forwarding planes. The focus of GMPLS is on the control plane.

Furthermore, the concept of Virtual Private Networks (VPNs) has been extended to layer 1 networks, recently. A Layer 1VPN (L1VPN) is a service offered by a core layer 1 network to provide layer 1 connectivity between two or more customer sites, and where the customer has some control over the establishment and type of the connectivity (see IETF RFC 4847).

GMPLS defines both routing and signaling protocols for the creation of Label Switched Paths (LSPs). In a peer model, edge nodes support both a routing and a signaling protocol. The protocol interactions between an edge node and a core node are the same as between two core nodes. In the overlay model, however, the core nodes act more as a closed system. The edge nodes do not participate in the routing protocol instance that runs among the core nodes; in particular, the edge nodes are unaware of the topology of the core nodes (see IETF RFC 4208).

In the overlay model, customer edge (CE) devices are connected over a User-Network Interface (UNI) to provider edge (PE) devices. PE devices are connected to other provider (P) devices via a Network-Network Interface (NNI).

Current UNIs include features to facilitate requests for end-to-end (i.e. CE to CE) services that include the specification of constraints such as bandwidth requirements, protection needs, and (of course) destinations. Current NNIs on the other hand include features to exchange routing information, as well as to facilitate requests for end-to-end services.

If one CE device is connected to two PE devices, this configuration is referred to as dual-homing. Dual-homing is typically used to avoid a single point of failure (e.g. UNI link or PE) or if two disjoint connections will form a protection group. Route diversity for LSPs from dual-homed CEs is a common requirement in optical transport networks.

SUMMARY OF THE INVENTION

A problem of the present invention is to achieve path diversity for dual-homed UNI-clients connected to a GMPLS control plane enabled transport network that is operated in an overlay mode.

EP2267954A1 describes a solution where network resources are assigned to different sets of resources in such a way that diversity is achieved if a first connection uses resources from a first resource set, only, while a second connection uses only resources form a second resource set. The sets must be constructed in such a way that path diversity is achieved provided that the two connections use different resource sets. This solution is somehow restrictive. Moreover, it requires more network resources and adds additional penalties to the network planning process as well as to the network operation.

US 2009/0103442 A1 describes constraint-based routing in multi-domain networks. For a connection path within a domain, a set of shared risk groups (SRGs) associated with resources used by the path is collected and stored within a shared risk group management device associated with that domain. A shared risk identification code is assigned to the set of shared risk groups. Risk information which contains the shared risk identification code and a shared risk groups management device identifier is communicated to the neighboring domain. This allows the neighboring domain to request a path to be routed SRG-disjoint by using the risk information to exclude resources that would share a same SRG.

The below described embodiments introduce signaling variations that may be used for supporting LSP diversity within the overlay extension service model considering dual-homing.

The L1VPN Framework in RFC4847 describes the overlay extension service model, which builds upon the UNI Overlay (RFC4208) serving as the interface between the CE device and the PE node. In this service model, a CE receives a list of CE-PE TE link addresses to which it can request a L1VPN connection (i.e., membership information) and may include additional information concerning these TE links. The described embodiments further build on the overlay extension service model by adding shared constraint information for path diversity in the optical transport network. This allows a different network entry point to calculate a path that is divers with respect to an existing path through the network that has a different network entry point.

In particular, within the provider network, shared constraint information of a first traffic path is determined and a data element indicative of the shared constraint information is returned by a first provider edge node to a customer edge device via a User-Network Interface. The shared constraint information contains Shared Risk Link Group identifiers of all provider network links used by the first traffic path and the data element contains an unordered list of Shared Risk Link Group identifiers of the first traffic path. When the customer edge device requests a second traffic path through the provider network to be established from a second provider edge node and to be disjoint from said first traffic path, the customer edge device forwards the data element to the second provider edge node to enable path calculation of the second traffic path using the shared constraint information as exclusion list.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
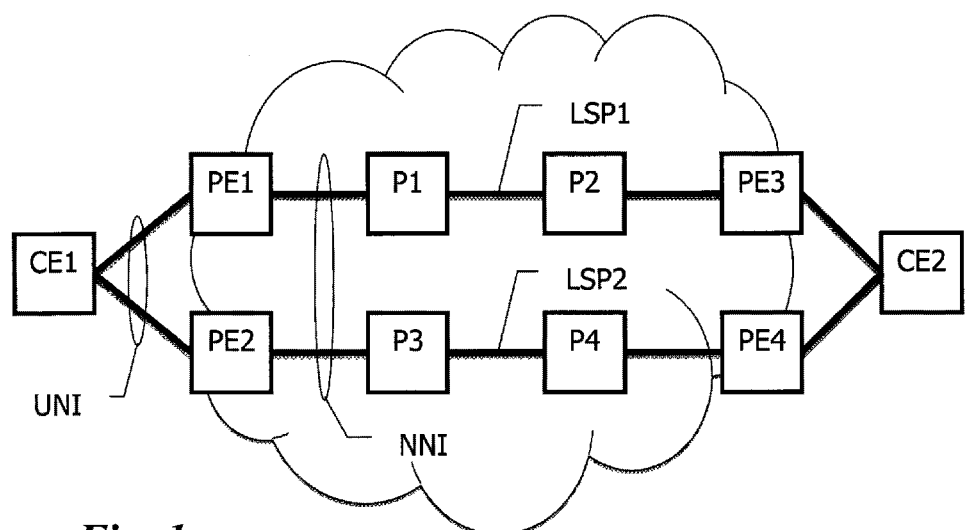
FIG. 1 shows an example network topology.

An simplified network example is shown in FIG. 1. A first customer edge device CE1 is connected in a dual-homed configuration to a first and a second provide edge node PE1, PE2. A second customer edge device CE2 is connected to provider edge nodes PE3, PE4. The provider network contains provider core nodes P1-P4. Provider edge nodes PE1-PE4 and provider core nodes P1-P4 are interconnected in a mesh topology, which is not shown for the sake of simplification. Connections are established over label switched paths LSP1, LSP2 between CE1 and CE2 via PE1, P1, P2, and PE3 and via PE2, P3, P4, and PE4. Label Switched Paths LSP1 and LSP2 are link diverse, so that no single point of failure exists for the two connections.

The interfaces between customer edge devices CE1, CE2 and provider edge nodes PE1, PE2, PE3, PE4, respectively, are User-Network Interfaces UNI, while interfaces between provider edge nodes PE1-PE4 and provider core nodes P1-P4 are Network-Network Interfaces NNI.

On the NNI, all provider nodes PE1-PE4, P1-4 exchange routing protocol messages using a routing protocol such as OSPF-TE to advertise topology and link state information, which is used to populate local routing databases in each provider node PE1-PE4, P1-4. Such routing messages are broadcasted to all other provider nodes, so that by listening to the routing messages, all provider nodes share the same topology and link state information about the entire provider network. The term routing database as used herein refers to the sum of all routing information stored in a PE node and can include an adjacency database, a link state database and a Traffic Engineering database.

On the UNI, however, no such routing information is exchanged, so that the CE devices CE1, CE2 do not receive any topology and link state information about the provider network. This is intentional because providers do not want to make information about topology and resource usage available to their customers. In an overlay model, the information exchanged between the CE and the PE is kept to a minimum.

By way of example, it is assumed in FIG. 1, that LSP1 is set up first. Thus CE1 has sent a request to PE1 for a connection to CE2. PE1 uses its local routing database to calculate a label switched path and then sends out signaling messages, using for instance RSVP-TE, to create the calculated path, i.e. LSP1 in the example.

It is further assumed that CE1 in a second step intends to set up a second LSP, i.e. LSP2, which shall be disjoint to exclude single points of failure for both LSPs. CE1 will thus send a second connection request to PE2.

However, since CE1 does not participate in the routing protocol on the NNI, it cannot have knowledge about the resources used by LSP1. PE2, on the other hand, has no knowledge about the fact that CE1 is dual-homed via PE1. Therefore, if CE1 just requests a link-disjoint connection from PE2, PE2, cannot know about the existence LSP1 at PE1 and that LSP2, to be established, needs to be resource-disjoint from LSP1.

One option would be, that CE1 indicates in the connection request to PE2 that the new connection shall be disjoint from an existing connection established from PE1. PE2 could then directly communicate with PE1 to learn which resources are used by LSP1 and which resources therefore need to be excluded from path calculation for LSP2. Such a direct communication is mentioned in EP1443716B1. However, this would require the definition and implementation of a new protocol for the PE-PE communication, which currently does not exist.

The inventors have thus thought of improved mechanisms for supporting LSP diversity within the overlay extension service model considering dual-homing, which build upon existing protocols and allow the CE to provide to the PEs data indicative of shared constraint information.

More particularly, the preferred embodiments use Shared Risk Link Group (SRLG) information as defined in IETF RFC4202, which is incorporated by reference herein.

A set of links may constitute a Shared Risk Link Group (SRLG) if they share a resource whose failure may affect all links in the set. For example, two fibers in the same conduit would be in the same SRLG. A link may belong to multiple SRLGs. Thus the SRLG Information describes a list of SRLGs that the link belongs to. An SRLG is identified by a 32 bit identifier that is unique within an Interior Gateway Protocol (IGP) domain. The SRLG Information is an unordered list of SRLGs that the link belongs to. The SRLG of a LSP is the union of the SRLGs of the links in the LSP. The SRLG of a bundled link is the union of the SRLGs of all the component links.

Link SRLGs are advertised in the routing protocol and are thus available in the routing database of each PE node. A PE node which processes a path request and performs path calculation can hence determine from its local information the SRLG of the calculated LSP. SRLG information is normally not shared between the transport network and the customer network; i.e., not shared with the CEs of a L1VPN in the L1VPN context.

In the following, two different signaling variations will be described that can be used to allow GMPLS to provide path diversity in a GMPLS controlled transport network.

As the two connections are entering the provider network at different PE devices, the PE device that receives the connection request for the second connection needs to be capable of determining the additional path computation constraints such that the path of the second LSP is disjoint with respect to the already established first connection entering the network at a different PE device. The methods according to the preferred embodiments allow a PE device to determine the SRLG information for a connection in the provider network that is entering the network on a different PE device.

While the described methods are similar in that they utilize common mechanisms in the PE network to achieve diversity, they are distinguished according to whether the CE is permitted to retrieve provider SRLG diversity information for an LSP from a PE1 and pass it on to a PE2 (i.e. SRLG information is shared with the CE), or whether a new attribute is used that allows the PE2 that receives this attribute to derive the SRLG information for an LSP based on this attribute value. The selection between these methods is governed by both PE-network specific policies and approaches taken (i.e., in terms of how the provider chooses to perform routing internal to their network).

In a first embodiment, it will be assumed that provider Shared Resource Link Group (SRLG) Identifier information is both available and shareable with the CE. This will be a policy decision of the provider. In the first embodiment SRLG IDs will hence be used as signalled information on a UNI message and passed transparently between PEs via the dual-homed CE The a second embodiment, it is assumed that provider SRLG IDs are either not available or not shareable (based on provider network operator policy) with the CE. For this case, a mechanism is described where information signalled to the PE on UNI messages does not require shared knowledge of provider SRLG IDs to support LSP diversity for the overlay extension model. Both approaches follow the L1VPN framework defined in RFC4847, which is incorporated by reference herein. While both methods could be implemented in the same PE network, it is likely that an L1VPN CE network would use only one mechanism at a time.

PE SRLG information can be used directly by a CE if the CE understands the context, and the CE view is limited to its L1VPN context. In this case, there is a dependency on the provider information and it is thus preferable to be able to query the SRLG in the provider network.

It may, on the other hand, be preferable to avoid this dependency and to decouple the SRLG identifier space used in the provider network from the SRLG space used in the customer network. This is possible with both methods detailed below. Even for the method where provider SRLG information is passing through the CE device the two SRLG identifier spaces can remain fully decoupled and the operator of the customer network is free to assign SRLG identifiers from the customer SRLG identifier space to the CE to CE connection that is passing through the provider network. It is worthwhile mentioning that the CE device does not need to process and decode SRLG information.

The described mechanisms can also be applied to a scenario where two CE devices are connected to two different PE devices. In this case, the additional information that is exchanged across the UNI interfaces also needs to be exchanged between the two CE devices in order to achieve the desired diversity in the provider network.

This information may be configured or exchanged by some automated mechanism, for example Link state database or Network Management, which is beyond the scope of this document, but which could be implemented by those skilled in the art based on the below description without undue experimentation.

The first embodiment employing an exchange of SRLG information between the PEs via the CE device will now be described in more detail.

SRLG information is defined in RFC4202 and if the SRLG information of an LSP is known, it can be used to calculate a path for another LSP that is SRLG diverse with respect to an existing LSP.

For example, CE1 in FIG. 1 may have requested an LSP1 from CE1 to CE2 via PE1 and PE3. CE1 could subsequently request an LSP2 to CE2 via PE2 and PE3 with the requirement that it should be maximally SRLG disjoint with respect to LSP1. Since PE2 does not have any information about LSP1, PE2 would need to know the SRLG information associated with LSP1. According to the embodiment, CE1 would request the SRLG information of LSP1 from PE1, and then transparently pass this information to PE2 as part of the LSP2 setup request. PE2 is therefore capable of calculating a path for LSP2 that is SRLG disjoint with respect to LSP1.

The exchange of SRLG information is achieved on a per L1VPN LSP basis using the existing RSVP-TE signaling procedures. It can be exchanged in the PATH (exclusion information) or RESV message in the original request or it can be requested by the CE at any time the path is active.

It shall be noted that SRLG information is an unordered list of SRLG identifiers and the encoding of SRLG information for RSVP signaling is defined in the IETF contribution "RSVP-TE Extensions for Collecting SRLG Information" by F. Zhang et al., draft-zhang-ccamp-srlg-fa-configuration-05.txt, March 2012, which is incorporated by reference herein. However, even if SRLG information is known for several LSPs, only a very limited view of the provider network topology is available from this information.

In the first embodiment, the following rules will apply to the CE-PE behavior:

When a dual-homed UNI-C intends to establish an LSP to the same destination UNI-C via another PE node, it can request the SRLG information for an already established LSP by setting the SRLG information flag in the LSP attributes sub-object of the RSVP PATH message.

As long as the SRLG information flag is set in the PATH message, the PE node inserts the SRLG sub-object as defined in draft-zhang-ccamp-srlg-fa-configuration-05.txt into the RSVP RESV message that contains the current SRLG information for the LSP. The PE passes on the SRLG information for the LSP.

If the provider network's policy has been configured so as not to share SRLG information with the customer network, the SRLG sub-object is not inserted in the PATH message even if the SRLG information flag is set.

When a dual-homed CE device sends an LSP setup requests to a PE device for a new LSP that is required to be SRLG diverse with respect to an existing LSP that is entering the network via another PE device, the UNI-C sets the SRLG diversity flag in the LSP attributes sub-object of the PATH message that initiates the setup of this new LSP. When the PE device receives this request it calculates a path to the given destination and uses the received SRLG information as path computation constraints. If no disjoint LSP can be found, the PE shall return an error message.

The SRLG diversity flag is new to the RSVP protocol and needs to defined accordingly.

Figure 2:
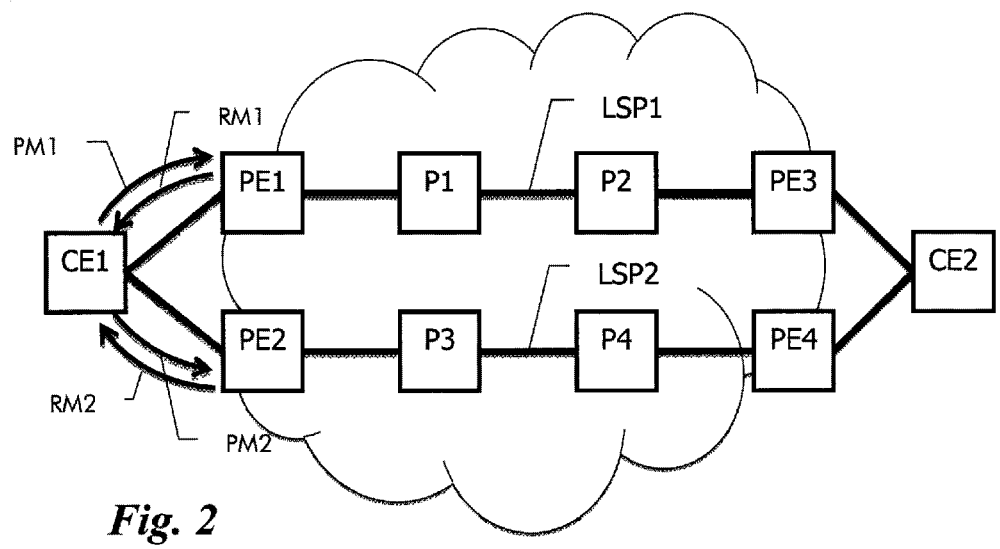
FIG. 2 shows a first signaling variant to exchange shared constraint information.

Turning now to FIG. 2, the communication in the specific example of FIG. 1 will be the following:

CE1 has sent an RSVP PATH message (not shown) to PE1 for LSP1, which has the SRLG information flag set. PE1 replies with a RESV Message RM1, which contains the SRLG sub-object of LSP1.

In a next step, CE1 sends a PATH message PM2 to PE2 to request setup of disjoint path LSP2. CE1 sets the SRLG diversity flag in the LSP attributes sub-object of PATH message PM2 and adds the received SRLG sub-object. PE2 then calculates LSP2 using the received SRLG as exclusion list.

When PE2 has established LSP2, it returns to CE1 a RESV message RM2, which includes an SRLG sub-object of LSP2. CE1 passes this information on to PE1 in a PATH message PM1.

PE1 and PE2 would then know about the SRLG lists of both LSPs LSP1, LSP2, so that if one of the LSPs has to be redirected, e.g. in a restoration scenario in case of a failure, the SRLG lists of the other LSP can be used as exclusion list for the path calculation of the redirected LSP.

While the first embodiment directly passes the SRLG list for path LSP1 over the UNI to the CE, the second embodiment described below introduces a new identifier called Path Affinity Set identifier, which references the SRLG list and is communicated instead of the latter.

The Path Affinity Set (PAS) is used to signal diversity in a pure CE context by abstracting SRLG information. There are two types of diversity information in the PAS. The first type of information is a single PAS identifier. Optionally, more detailed PATH information of an exclude path or set of paths can be specified. The motive behind the PAS information is to have as little exchange of diversity information as possible between the L1VPN CE and PE elements.

Rather than a detailed CE or PE SRLG list, the Path Affinity Set contains an abstract SRLG identifier that associates the given path as diverse. Logically the identifier is in an L1VPN context and therefore only unique with respect to a particular L1VPN.

How the CE determines the PAS identifier is a local matter for the CE administrator. A CE may signal PAS as a diversity object in the PATH message. This identifier is a suggested identifier and may be overridden by a PE under some conditions.

For example, PAS can be used with no prior exchange of PAS information between the CE and the PE. Upon reception of the PAS information the PE can infer the CEs requirements. The actual PAS identifier used will be returned in the RESV message. Optionally an empty PAS identifier allows the PE to pick the PAS identifier. Similar to the first embodiment using SRLG information, a PE can return PAS identifier as the response to a query allowing flexibility.

A PE interprets the specific PAS identifier, for example, "123" as meaning to exclude that identifier and by association any PE related SRLG information, for any LSPs associated with the resources assigned to the L1VPN. For example, if a Path exists for the LSP with the identifier "123", the PE would use local knowledge of the PE SRLGs associated with the "123" LSPs and exclude those SRLGs in the path request. In other words, two LSPs that need to be diverse both signal "123" and the PEs interpret this as meaning not to use shared resources. Alternatively, a PE could use the PAS identifier to select from already established LSPs. Once the path is established it becomes associated with the "123" identifier or optionally another PAS identifier for that L1VPN.

The PAS Source and Destination Address tuple represents one or more source addresses and destination addresses associated with the CE Path Affinity Set identifier. These associated address tuples represent paths that use resources that should be excluded for the establishment of the current LSP. The address tuple information gives both finer grain details on the path diversity request and serves as an alternative identifier in the case when the PAS identifier is not known by the PE. The address tuples used in signaling is within a CE context and its interpretation is local to a PE that receives a Path request from a CE. The PE can use the address information to relate to PE Addresses and PE SRLG information. When a PE satisfies a connection setup for a (SRLG-) diverse signaled path, the PE may optionally record the PE SRLG information for that connection in terms of PE based parameters and associate that with the CE addresses in the Path message.

The L1VPN Port Information table (PIT) defined in RFC5251 can be leveraged to translate between CE based addresses and PE based addresses. The Path Affinity Set and associated PE addresses with PE SRLG information can be distributed via the IGP in the provider transport network or by other means such as configuration; they can be utilized by other PEs when other CE Paths are setup that would require path/connection diversity. This information is distributed on a L1VPN basis and contains a PAS identifier, PE addresses and SRLG information.

The CE Path Affinity Set may be used to signal paths without CE Source and Destination addresses; however, the PE will preferably associate the CE SRLG Group with a list of PE SRLG plus the PE addresses associated with this LSP.

If diversity is not signaled, the assumption is that no diversity is required and the Provider network is free to route the LSP to optimize traffic. No Path affinity set information needs to be recorded for these LSPs. If a diversity object is included in the connection request, the PE in the Provider Network should be able to look-up the existing Provider SRLG information from the provider network and choose an LSP that is maximally diverse from other LSPs.

Figures 3, 4:
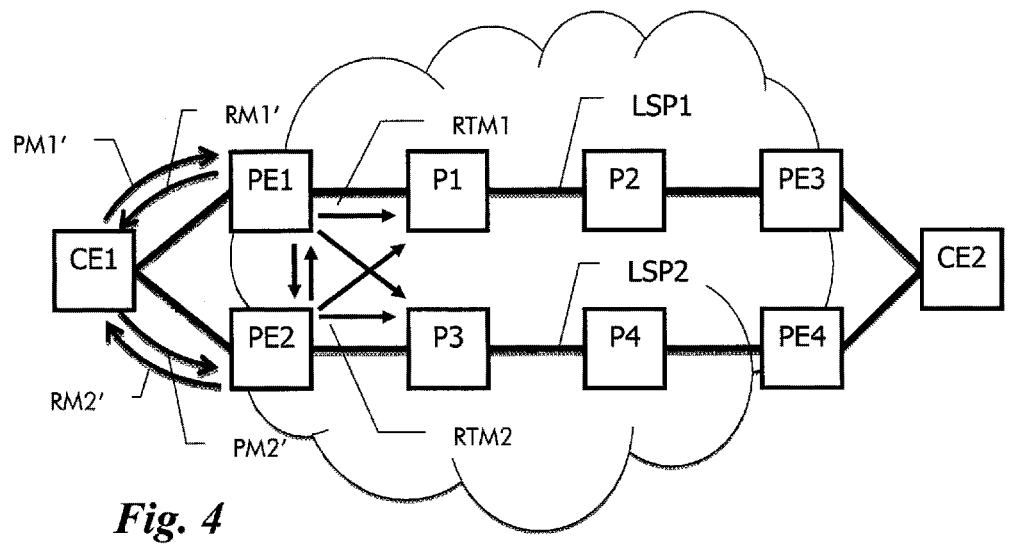
FIG. 3 shows a new L1VPN Diverse LSP LABEL object used to signal shared constraint information to and from a customer edge device.
FIG. 4 shows second signaling variant to exchange shared constraint information.

FIG. 3 shows an Diverse LSP information object that can be used for communication on the UNI between CE and PE. It contains the following fields:

1. The Address Length field (8 bits) is the number of bytes for both the source address and destination address. The address may be in any format from 1 to 32 bytes but the key point is the customers can maintain their existing addresses. A value of zero indicates there are no addresses included.
2. The Number of Path Affinity (8 bits)sets is included in the object. This is typically 1. It can be used to indicate that there are more than 1 other LSPs, which need to be routed link-diverse.
3. The Path affinity Set identifier (4 bytes) is a single number that represents a summarized SRLG for this path. Paths with that same Path Affinity set should be set up with diverse paths and associated with the path affinity set. A value of all zeros allows the PE to pick a PAS identifier to return. A PAS identifier of an established path may be different than the requested path identifier.
4. The diversity Bit (D) (one Bit) indicates if the diversity must be satisfied when set as a one. If a PE finds an established path with a Path Affinity set matching the signaled Path Affinity Set or the signaled Address tuple it should attempt to find a diverse path.
5. The Diverse Path Source address/destination address tuple is that of an established LSP in the PE network that belongs to the same Path Affinity Set identifier. If the path for these addresses is not setup or cannot be determined by the PE edge processing the UNI, then the path is only with the Path Affinity set constraint. If the path(s) for these address tuples are known by the PE, the PE uses the SRLG information associated with these addresses. If in any case a diverse path cannot be setup, then the Diverse bit controls whether a path is established anyway. The PE must use a mechanism to translate CE Addresses into provider addresses when correlating with provider SRLG information.

Other control bits for other semantics can be added as needed. For example if a pure diverse path is not available, find a minimally intersecting path. Or do not allow the PAS identifier to be overridden. The latter could be useful in a case where a CE is configured.

In the second embodiment, the following rules will apply to the CE-PE behavior:

When a UNI-C constructs a PATH message, it may optionally specify and insert a Path Affinity Set in the PATH message. This Path Affinity Set may optionally include the address of an LSP that could belong to the same Path Affinity Set. The Path Affinity Set identifier is a value (1 through $2^{32}$-255) that is independent of the mechanism the CE or the PE use for diversity. The Path Affinity Set contains a single identifier that can be used to request diversity and associate diversity. A value of zero is a special value that means the PE may assign a value.

When processing a CE PATH message in a L1VPN Overlay, the PE first looks up the PE based addresses in the Provider Index Table (PIT). If the Path Affinity Set is included in the PATH message, the PE must look up the SRLG information (or equivalent) in the PE network that has been allocated by LSPs associated with a Path Affinity Set and exclude those resources from the path computation for this LSP if it is a new path. The PE may alternatively choose from an existing path with a disjoint set of resources. If a path that is disjoint cannot be found, the value of the PAS diversity bit determines whether a path should be setup anyway. If the PAS diversity bit is clear, one can still attempt to setup the LSP. A PE should still attempt to minimize shared resources. If on the other hand, PAS diversity bit is set, the PE would return an error code.

Optionally the CE may use a value of all zeros in the PAS identifier allowing the PE to select an appropriate PAS identifier. Also the PE may choose to override the PAS identifier allowing the PE to re-assign the identifier if required. A CE should not assume that the PAS identifier used for setup is the actual PAS identifier.

The PAS object must be understood by the PE device. Otherwise, the CE should not use the PAS object. Path Message processing of the PAS object should follow CTYPE 0 (predefined default procedure). An another specific error code would be used to indicate that the PAS object is not understood.

When a PAS identifier is not recognized by a PE, it will assume this LSP defines that PAS identifier. The PE may, however, override PAS identifier under certain conditions.

If the identifier is recognized but the Source Address-Destination address pair(s) are not recognized, this LSP should be set up using the PAS identifier only.

If the identifier is recognized and the Source Address-Destination address pair(s) are also recognized, then the PE will use the PE SRLG information associated with the LSPs identified by the address pairs to select a disjoint path.

The Path Affinity Set information will be distributed in the provider network using a routing protocol. Information about SRLG is already available in the IGP Traffic Engineering database. A PE network can be designed to have additional opaque records for Provider paths that distribute PE paths and SRLG on a L1VPN basis. When a PE path is setup, the following information allows a PE to lookup the PE diversity information:

L1 VPN Identifier 8 bytes
Path Affinity Set Identifier
Source PE Address
Destination PE Address
List of PE SRLG (variable)

The source PE address and destination PE address are the same addresses in the L1VPN PIT and correspond to the respective CE address identifiers.

Note that all of the information is local to the PE context and is not shared with the CE. The L1VPN Identifier is associated with a CE. The only value that is signaled from the CE is the Path Affinity Set and optionally the addresses of an existing LSP. The PE stores source and destination PE addresses of the LSP in their native format along with the SRLG information. This information is internal to the PE network and is always known. It may be shared with other PEs or PCE devices through a number of mechanisms.

PE paths may be setup on demand or they may be pre-established. When paths are pre-established, the Path Affinity Set is set to unassigned 0×0000 and is ignored. When a CE uses a pre-established path the PE may set the Path SRLG Path Affinity Set value if the CE signals one, otherwise the Path Affinity Set remains unassigned 0×0000.

Returning now to FIG. 4, the communication according to the second embodiment would be as follows. First, CE1 will send to PE1 a PATH message PM1' which includes a diversity flag set to 1. Optionally, PATH message PM1' can also include a proposed value for the PAS identifier. PE1 will calculate and establish LSP1. Path calculation and setup will use well known mechanisms and GMPLS protocols. It should be understood that PATH message PM1' can also be sent in case LSP1 is already active, since according to RSVP, PATH and RESV messages are periodically resent to refreshed the status of an LSP.

When receiving PATH message PM1' with activated diversity flag, PE1 will determine the SRLG of LSP1 and assign a PAS identifier for this SRLG. If PATH message PM1' already contained a value for the PAS identifier, PE1 will preferably use this value. It may be however, that the value is not the best to be used, e.g. because the PE uses a better value. In such case, PE1 will choose a new value and overwrite the value provided by CE1. In any case. PE1 will return to CE1 a RESV message RM1' with a PAS object that contains the chosen value for the PAS identifier.

PE1 will then advertise the previously determined SRLG list and corresponding PAS object via the NNI in the provider network using the OSPF-TE routing protocol. More particularly, PE1 will sent at all its NNIs OSPF messages RTM1 to share the SLRG/PAS information. Each node P1-P4, PE1-PE4 in the provider network will receive the OSPF message RTM1, directly or indirectly (i.e. forwarded), and store the PAS object and corresponding SRLG list in its routing database.

In a next step, CE1 will send a path request PM2' to PE2 requesting a new path LSP2. This path request PM2' is a RSVP PATH message which contains the PAS object. The PAS object contains the identifier as received from PE1 as well as the diversity flag D set to 1.

PE2 will look up in its routing database the SRLG list that corresponds to the received PAS identifier and use this SRLG list as an exclusion list for the path calculation. The path calculation can thus be performed with only local knowledge of PE2. PE2 will hence calculate LSP2 and initiate path setup using standard RSVP signaling.

As a next step, since the diversity flag was enabled, PE2 will determine the SRLG of LSP2 and assign the same PAS object thereto. PE2 will then send out OSPF routing messages RTM2 to advertise the PAS object with the updated SLRG information. PE1 will receive a routing message RTM2 and update its routing database. Therefore, in case of a failure along LSP1, PE1 is able to restore LSP1 using the SRLG of LSP2 as exclusion list.

PE2 will also return a RESV message RM2' to CE1 to signal the successful creation of LSP2. RESV message RM2' will also contain the PAS object to confirm the PAS identifier, which will be the same as the PAS identifier of LSP1.

Figure 5:
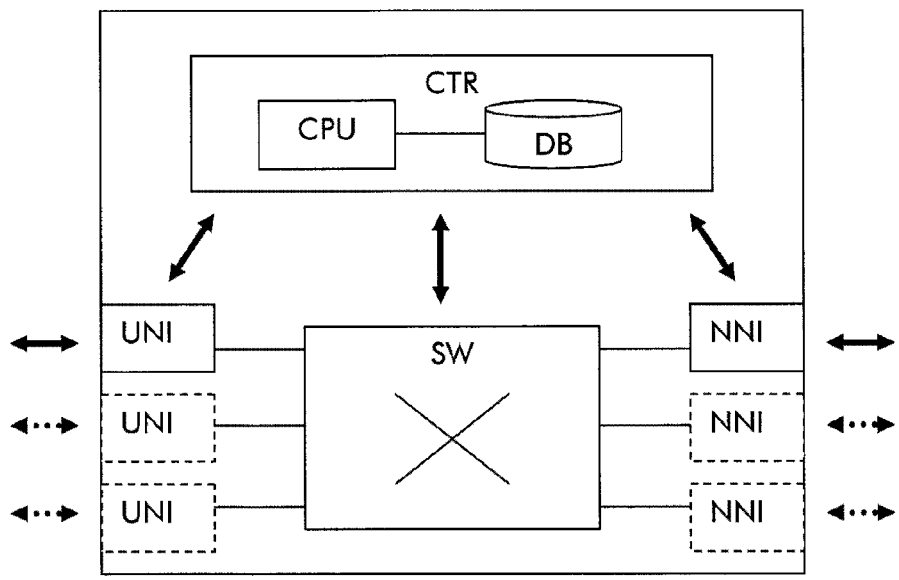
FIG. 5 shows a block diagram of a provider edge node.

A simplified block diagram of a provider edge node PE is shown in FIG. 5. A provider edge node can be for example a TDM switch, an Optical Cross-Connect (OXC), or a Photonic Cross-Connect (PXC). Alternatively, a PE device may be an Ethernet Private Line (EPL) type of device that maps Ethernet frames onto layer 1 connections by means of Ethernet over TDM.

A provider edge node PE, as shown in FIG. 5, has one or more User-Network Interfaces UNI, one or more Network-Network Interfaces NNI and a switch device interconnecting user traffic from the UNIs to network connections at the NNIs. The switch device can for instance be for example a TDM switch, a space switch, a wavelength switch or a cell based switch.

The provider edge node PE further has an associated controller CTR, which processes control traffic from the UNIs and the NNIs, and controls the switch device to perform appropriate switch functions. Controller CTR has a processor CPU and a storage device which contains a routing database DB.

Controller CTR runs a GMPLS routing agent and corresponding GMPLS protocol stacks and communicates with attached customer edge node(s) via the UNI(s) and with other provider nodes via the NNI(s). The controller is programmed to receive and transmit the signaling and routing protocol messages as specified above.

Figure 6:
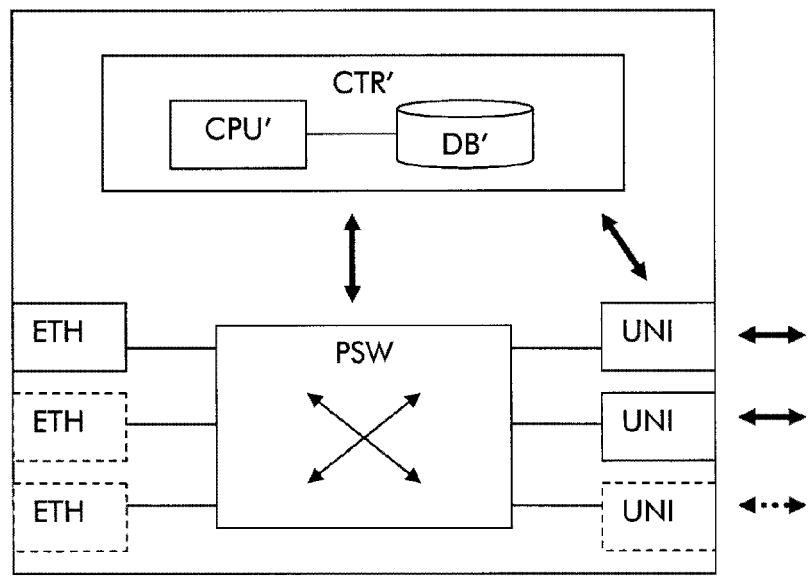
FIG. 6 shows a block diagram of a customer edge device.

A simplified block diagram of a Customer Edge device CE is shown in FIG. 6. A CE device can be a variety of devices, for example, Time Division Multiplexing (TDM) switch, router, and layer 2 switch. The Customer Edge device CE has at least two User-Network interfaces to support dual-homing. In the shown embodiment, Customer Edge device CE has one or more Ethernet interfaces ETH for data connection within a customer network and a packet switch PSW selectively interconnecting user packet data from the Ethernet interfaces ETH to traffic paths terminated at the UNIs. The packet switch can be implemented for example using a shared memory switch and a network processor for header processing that steers reading and writing to the memory switch in dependence of destination addresses read from the packet headers.

Similar to provider edge node PE in FIG. 5, customer edge node CE has an associated controller CTR', which processes control traffic from the UNIs, and controls the packet switch SW to perform appropriate switch functions. Controller CTR' has a processor CPU' and a storage device which stores a routing table DB'. It should be understood that routing table DB' represents the client network routing data base that is distinct from the routing data base in the provider network, of which the client network has no visibility.

Controller CTR runs a UNI agent and corresponding RSVP protocol stack and communicates with attached provider edge nodes via the UNIs. The controller is programmed to receive and transmit the signaling protocol messages as specified above.

The above embodiments make use of a distributed control plane and local GMPLS routing agents running on each provider (edge) node. It should be understood that similar mechanisms and protocol extensions can also be used in a centralized architecture with a Path Computing Element (PCE) and the provider edge nodes PE1, PE2 as Path Computing Clients (PCC).

In general, different PCE/PCC approaches have been proposed and are currently under discussion at IETF. In one approach, the PCE can be a stateful PCE, i.e. having knowledge of all LSPs in the network. In another approach, however, the PCE can be stateless. If a stateless PCE is used, PE1 and PE2 would independently request path computation from the PCE include the diversity attributes in their path computation requests. The PCE will then perform path computation for the PEs, one after the other, will additionally determine and return SRLG information and consider the SRLG information as exclusion list to achieve link-diverse LSPs.

More particularly, in the first embodiment, when a PCE is involved, PE1 will receive the SRLG of LSP1 from the PCE and forward it in return message RM1 to CE1. PE2, upon receipt of path request message PM2, which includes the SRLG list that corresponds to LSP1, will forward the SRLG information to the PCE so that the PCE can this as exclusion list for the calculation of LSP2. This would enable even a stateless PCE to perform link-diverse path calculation in a dual-homing network topology. In a similar way, also the second embodiment can be employed in a context with a stateless PCE.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors" or "CPUs", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, or through the interaction of program control and dedicated logic, the particular technique being selectable by the implementer as more specifically understood from the context.

The invention claimed is:

1. A method of establishing traffic paths through a provider network, wherein a customer edge device is connected to a first provider edge node and to a second provider edge node via User-Network Interfaces, and wherein said provider edge nodes are interconnected directly or indirectly with provider core nodes and further provider edge nodes via Network-Network Interfaces to form said provider network, and wherein said provider edge nodes and said provider core nodes exchange routing information over said Network-Network Interfaces using a routing protocol, the method comprising:
   requesting by said customer edge device a first traffic path through said provider network to be established from said first provider edge node;
   within said provider network, calculating said first traffic path using said routing information and initiating setup of said first traffic path using a signaling protocol;
   requesting by said customer edge device a second traffic path through said provider network to be established from said second provider edge node and to be disjoint from said first traffic path;
   within said provider network, calculating said second traffic path using said routing information and a constraint such that said second traffic path is disjoint from said first traffic path and initiating setup of said second traffic path using said signaling protocol;
   determining shared constraint information of said first traffic path and returning from said first provider edge node to said customer edge device via a User-Network Interface a data element indicative of said shared constraint information; and
   forwarding said data element from said customer edge device to said second provider edge node to enable path calculation of said second traffic path such that said second traffic path is disjoint from said first traffic path using said shared constraint information as an exclusion list;
   wherein said shared constraint information comprises Shared Risk Link Group identifiers of all provider network links used by said first traffic path, and wherein said data element comprises an unordered list of Shared Risk Link Group identifiers of said first traffic path.

2. The method according to claim 1, wherein said step of determining said shared constraint information is carried out upon receipt of a message sent by said customer edge device to said first provider edge node having a diversity flag set.

3. The method according to claim 2, wherein said message is a PATH message according to a Resource ReserVation Protocol with Traffic Engineering Extension.

4. The method according to claim 1, wherein said step of returning said data element to said customer edge device comprises sending a RESV message according to a Resource ReserVation Protocol with Traffic Engineering Extension comprising said data element as a Label Switched Paths (LSPs) attributes sub-object.

5. The method according to claim 1, further comprising:
   after calculating said second traffic path, determining at said second provider edge node shared constraint information of said second traffic path and returning to said customer edge device via said User-Network Interface a second data element indicative of said shared constraint information of said second traffic path; and
   forwarding said second data element from said customer edge device (CE1) to said first provider edge node.

6. The method according to claim 1, wherein said network further comprises one or more Path Computing Elements which communicate with said provider edge nodes, and wherein said steps of calculating traffic paths and determining shared constraint information for said traffic paths are carried out by any of said Path Computing Elements.

7. A provider edge node in a provider network comprising at least one User-Network Interface for connecting to a customer edge device, at least one Network-Network Interface for connecting to other provider nodes, a switch device interconnecting user traffic from the at least one User-Network Interface to network connections at the Network-Network Interface, and a controller, said controller comprising a programmable processor and a routing database, wherein said controller is configured to
   exchange routing information over said Network-Network Interfaces using a routing protocol and store routing information received at said Network-Network Interfaces in said routing database;
   receive via said User-Network Interface a request to establish a first traffic path through said provider network;
   calculate said first traffic path using said routing information;
   initiate setup of said first traffic path using a signaling protocol; and
   determine shared constraint information of said first traffic path and return to said customer edge device via said User-Network Interface a data element indicative of said shared constraint information;
   wherein said shared constraint information comprises Shared Risk Link Group identifiers of all provider network links used by said first traffic path, and wherein said data element comprises an unordered list of Shared Risk Link Group identifiers of said first traffic path, and wherein said controller is further configured to receive together with a request to establish a second traffic path a data element indicative of said shared constraint information and to perform path calculation using said shared constraint information as an exclusion list such that said second traffic path is disjoint to said first traffic path.

8. A customer edge device, comprising at least two User-Network interfaces for connecting to two different provider edge nodes and a controller in a provider network, said controller being configured to
   request via a first of said User-Network interfaces a first traffic path through said provider network;

receive at said first User-Network interface a data element indicative of shared constraint information of said first traffic path;

request via a second of said User-Network interfaces a second traffic path through said provider network to be disjoint from said first traffic path; and forward at said second User-Network Interface said data element received via said first User-Network Interface to enable path calculation of said second traffic path using said shared constraint information as an exclusion list;

wherein said shared constraint information comprises Shared Risk Link Group identifiers of all provider network links used by said first traffic path, and wherein said data element comprises an unordered list of Shared Risk Link Group identifiers of said first traffic path.

9. The method according to claim 1, wherein said data element comprises an identifier which references said unordered list of Shared Risk Link Group identifiers of said first traffic path.

* * * * *